United States Patent [19]

Hosaka

[11] Patent Number: 4,580,212
[45] Date of Patent: Apr. 1, 1986

[54] COMPUTER HAVING CORRECTABLE READ ONLY MEMORY

[75] Inventor: Akio Hosaka, Yokosuka, Japan

[73] Assignee: Nissan Motor Co., Ltd., Yokohama, Japan

[21] Appl. No.: 360,419

[22] Filed: Mar. 22, 1982

[30] Foreign Application Priority Data

Mar. 23, 1981 [JP] Japan .................. 56-40481

[51] Int. Cl.$^4$ .............................................. G06F 9/06
[52] U.S. Cl. .................................................. 364/200
[58] Field of Search ... 364/200 MS File, 900 MS File, 364/200, 900; 371/8, 10, 11, 21

[56] References Cited

U.S. PATENT DOCUMENTS

| | | | |
|---|---|---|---|
| 3,434,116 | 3/1969 | Anacker | 364/200 |
| 3,517,171 | 6/1970 | Avizienis | 364/200 |
| 3,633,175 | 1/1972 | Harper | 364/200 |
| 3,659,275 | 4/1972 | Marshall | 364/200 X |
| 3,665,418 | 5/1972 | Bouricius et al. | 364/200 |
| 3,753,244 | 8/1973 | Sunilas et al. | 364/200 |
| 3,803,560 | 4/1974 | De Voy et al. | 364/200 |
| 3,898,631 | 8/1975 | Brown et al. | 365/230 |
| 3,934,227 | 1/1976 | Worst | 364/200 |
| 4,010,450 | 3/1977 | Porter et al. | 364/200 |
| 4,030,080 | 6/1977 | Burkett et al. | 364/900 |
| 4,051,460 | 9/1977 | Yamada et al. | 364/900 |
| 4,079,447 | 3/1978 | Garziera | 364/200 |
| 4,089,063 | 5/1978 | Takezono et al. | 364/200 X |
| 4,167,781 | 9/1979 | Beccia et al. | 364/200 |
| 4,191,996 | 3/1980 | Chesley | 371/18 X |
| 4,303,993 | 12/1981 | Panepinto, Jr. et al. | 364/200 X |
| 4,456,993 | 6/1984 | Taniguchi et al. | 371/10 |
| 4,488,257 | 12/1984 | Hosaka . | |

FOREIGN PATENT DOCUMENTS 54-139443 10/1979 Japan .
55-153188 11/1980 Japan .

OTHER PUBLICATIONS

E. G. Brooks, "Extendable Control Store", IBM Technical Disclosure Bulletin, vol. 19, No. 3, Aug. 1976, p. 1062.
M. E. Houdek, "Read-Only Patch Card", IBM Technical Disclosure Bulletin, vol. 17, No. 6, Nov. 1974, p. 1742.
Patent Abstracts of Japan, vol. 3, No. 159, Dec. 27, 1979, (E-162) p. 51.
Lengyel et al., "Computer Program Protection" IBM Technical Disclosure Bulletin, vol. 14, No. 11, p. 3531 (Apr. 1972).

Primary Examiner—Thomas M. Heckler
Attorney, Agent, or Firm—Schwartz, Jeffery, Schwaab, Mack, Blumenthal & Evans

[57] ABSTRACT

A computer having a main read only memory is so arranged that a portion of the information stored in the main read only memory can be changed, if desired, without changing the entire main memory. Information to be substituted for a portion of the main information contained in the main memory is stored in a correction memory, which is incorporated in the computer when required. The CPU is arranged to fetch and use instructions or data alternatively from the main memory or the correction memory in such a manner that a predetermined portion of the main information is replaced by the substitute information. In one embodiment, data is stored in the correction memory for designating which portion is to be replaced and the CPU selects either memory depending upon this data. In another embodiment, one or more comparators are used for comparing the value on an address bus with addresses for designating the start and the end of the portion to be replaced.

18 Claims, 12 Drawing Figures

COMPUTER HAVING CORRECTABLE READ ONLY MEMORY

BACKGROUND OF THE INVENTION

The present invention relates to a computer with a read only memory whose contents can be partially changeable.

In computers, especially microcomputers, read only memories (ROMs) are used for saving fixed data and programs. ROMs fall into several categories, the most common three being:

(1) Mask programmed ROMs, usually referred to simply as ROMs, in which the information is inserted during manufacturing and cannot be changed. Mask programmed ROMs have the advantage that they are comparatively cheap and reliable.

(2) PROMs in which the information is inserted after manufacturing but cannot be changed, either. They are reliable and not too expensive.

(3) EPROMs in which the information is inserted after manufacturing and can be changed. However, they are expensive and less reliable.

In view of the above, mask ROMs are widely used in devices which require high reliability and low cost. A typical example of such devices is an electronic control system for automobiles. Accordingly, if a change of the information stored in a mask ROM is required, the mask ROM is replaced in whole by a new one. However, it is costly and time consuming to prepare a new ROM pattern. Besides, all the information must be replaced even if only a portion, one bit or two, for example, requires a change.

There has been proposed a method for modifying a portion of the information of ROM in Japanese patent provisional publication Sho. 54-160141, for example. However, this method is not suitable for a system such as control systems for automobiles, because this method requires a complicated and costly storage means.

SUMMARY OF THE INVENTION

It is an object of the present invention to provide a computer in which any desired portion of a main read only memory can be corrected by using a correction memory which need not be prepared until such a correction becomes necessary and need not store all the information of the main read only memory.

According to the present invention, there are provided main read only storage means for storing main information and correction storage means which stores substitute information to be substituted for at least one portion of the main information and which is mounted and incorporated in the computer when such a change of the main information is required. A CPU is arranged to fetch and use the main information without change if the correction storage means is not incorporated in the computer. If, however, the correction storage means is incorporated, the CPU is arranged to fetch information (instructions or data) alternatively from the main storage means or the correction storage means in such a manner that the portion of the main information is replaced by the substitute information of the correction storage means. In one embodiment of the present invention, there is further provided means for detecting whether the correction storage means is mounted and incorporated in the computer, and on the other hand, data is stored in the correction storage means for designating which portion is to be replaced. In accordance with this data, the CPU determines when to fetch the substitute information from the correction storage means and substitute it for the portion of the main information. In another embodiment, a data bus is arranged to selectively connect the CPU with either of the main storage means or the correction storage means under the control of comparing means for comparing the value on an address bus with a predetermined address. Thus, when the comparing means detects that the CPU is accessing a predetermined memory location where the portion of the main information is stored, the data bus is switched to connect the CPU with the correction storage means. There is further provided second comparing means for detecting when to switch the data bus again to reconnect the CPU with the main storage means. In still another embodiment, the portion of the main information is replaced by the substitute information by using an interrupt system.

DETAILED DESCRIPTION OF THE INVENTION

Figure 1:
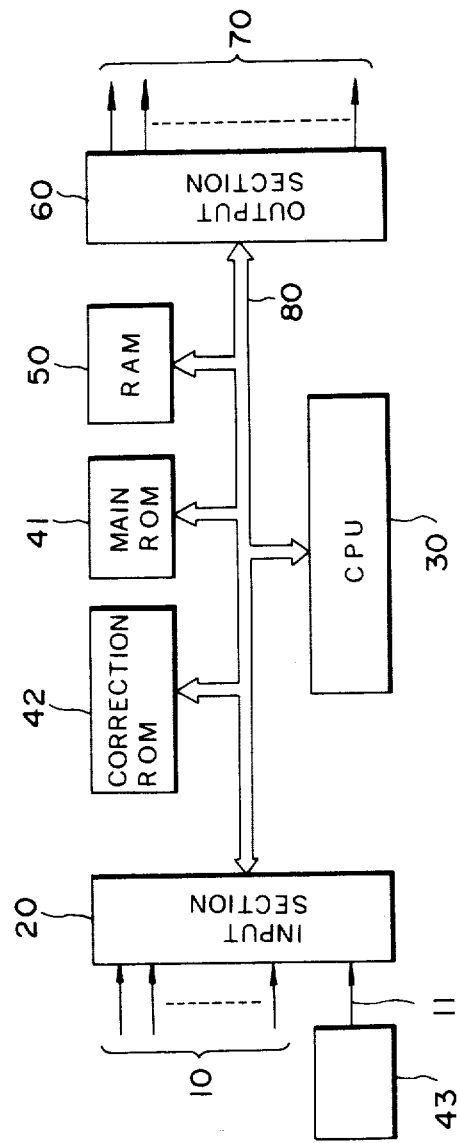
FIG. 1 is a block diagram of a computer incorporating correction storage means used to explain a first embodiment of the present invention.

In FIG. 1, a computer system comprises a central processing unit (CPU) 30, a main read only memory (ROM) 41, a read write memory (RAM) 50, an input section 20 for receiving input signals 10, an output section 60 for outputting output signals 70, and a system bus 80. The system bus 80 comprises a data bus, an address bus and a control bus. The main read only memory 41 stores main information such as a program comprising a set of instructions and/or data. In the computer system of FIG. 1, there is further provided a correction read only memory 42 for storing a new program or data which is to be substituted for a portion of main information of the main ROM. The correction ROM 42, as well as the main ROM 41, are connected with the CPU by the system bus 80. A mask ROM is used as the main ROM 41 and a PROM as the correction ROM 42, for example.

A reference numeral 11 denotes a discrimination signal for discriminating whether the correction ROM 42 is mounted and incorporated in the computer system. That is, the discrimination signal 11 indicates whether a correction is required anywhere in the main ROM or not. For example, the discrimination signal 11 is "one" when the correction ROM 42 is mounted, and "zero" when it is not. The discrimination signal 11 is produced by a signal generator 43 and sent to the CPU 30 through the input section 20.

Figure 2:
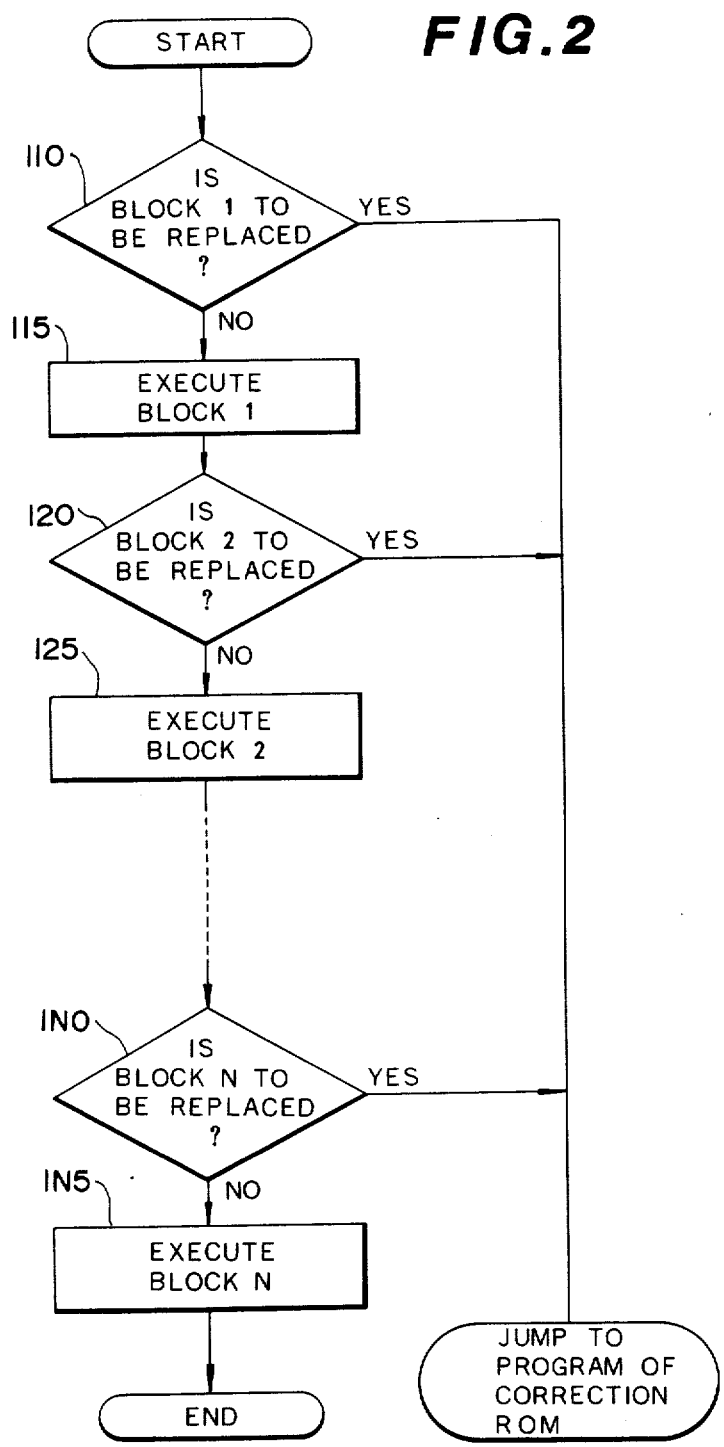
FIG. 2 is a flowchart showing a main program used in the embodiment depicted in FIG. 1.
Figure 3:
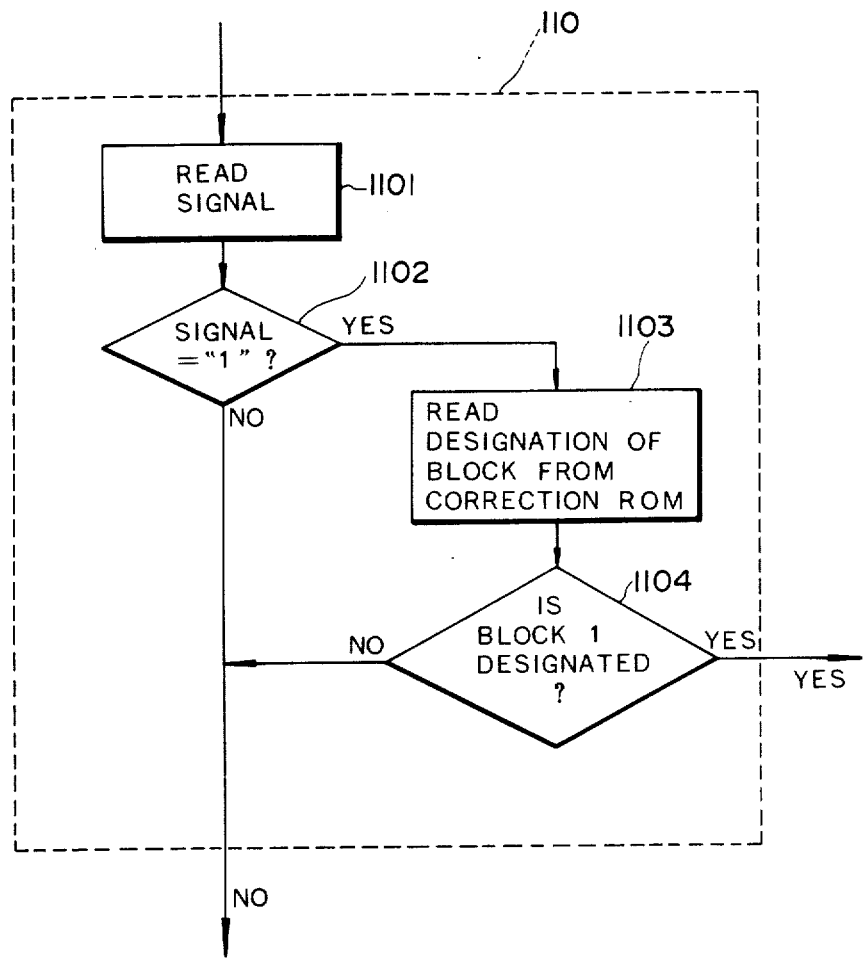
FIG. 3 is a flowchart of steps constituting a first version of block 110 of FIG. 2.
Figure 4:
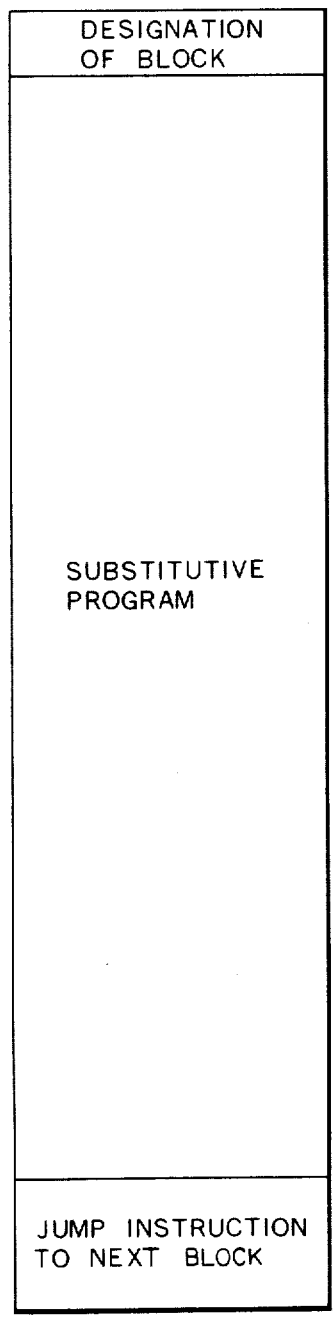
FIG. 4 a schematic illustration of the memory structure of a correction memory as might be used in connection with the first version of block 110.

A main program stored in the main ROM 41 is shown in FIG. 2 and partially in detail in FIG. 3, and the contents of the correction ROM 42 is shown in FIG. 4. As shown in FIG. 2, the main program, is divided into N blocks. At the beginning 110, 120, . . . , 1N0 of each block, the CPU 30 checks if that block is to be changed. If it is not, the CPU 30 executes that block without change at each of steps 115, 125, . . . , 1N5. If a given block is to be changed, the CPU executes a substitutive program stored in the correction ROM 42. The check step 110 by way of example is shown in more detail in FIG. 3. At a step 1101, the CPU 30 reads the discrimination signal 11 and then checks if the signal is equal to one, at a step 1102. If the signal is one, the CPU reads the contents of the first location of the correction ROM 42, which is a designation of a block, as shown in FIG. 4. At a step 1104, the CPU checks whether the designation is one, that is, whether the number one block is designated by the designation. If the designation is not one (or if the discrimination signal is zero), the CPU decides that that block is not to be changed. If the designation is one, the CPU decides that that block is to be changed, and accordingly executes the substitutive program stored in the correction ROM 42. At the end of the substitutive program, the CPU returns to the main program of the main ROM 41 at the beginning of the next block, that is, the step 120 of the number two block, in this example. Other check steps 120, . . . , 1N0 are the same as the step 110 except that the number of the block is changed. Although the number one block is changed in this example, any of the blocks can be changed by storing an appropriate designation, substitutive program and jump instruction to a next block in the correction ROM 42.

Figure 5:
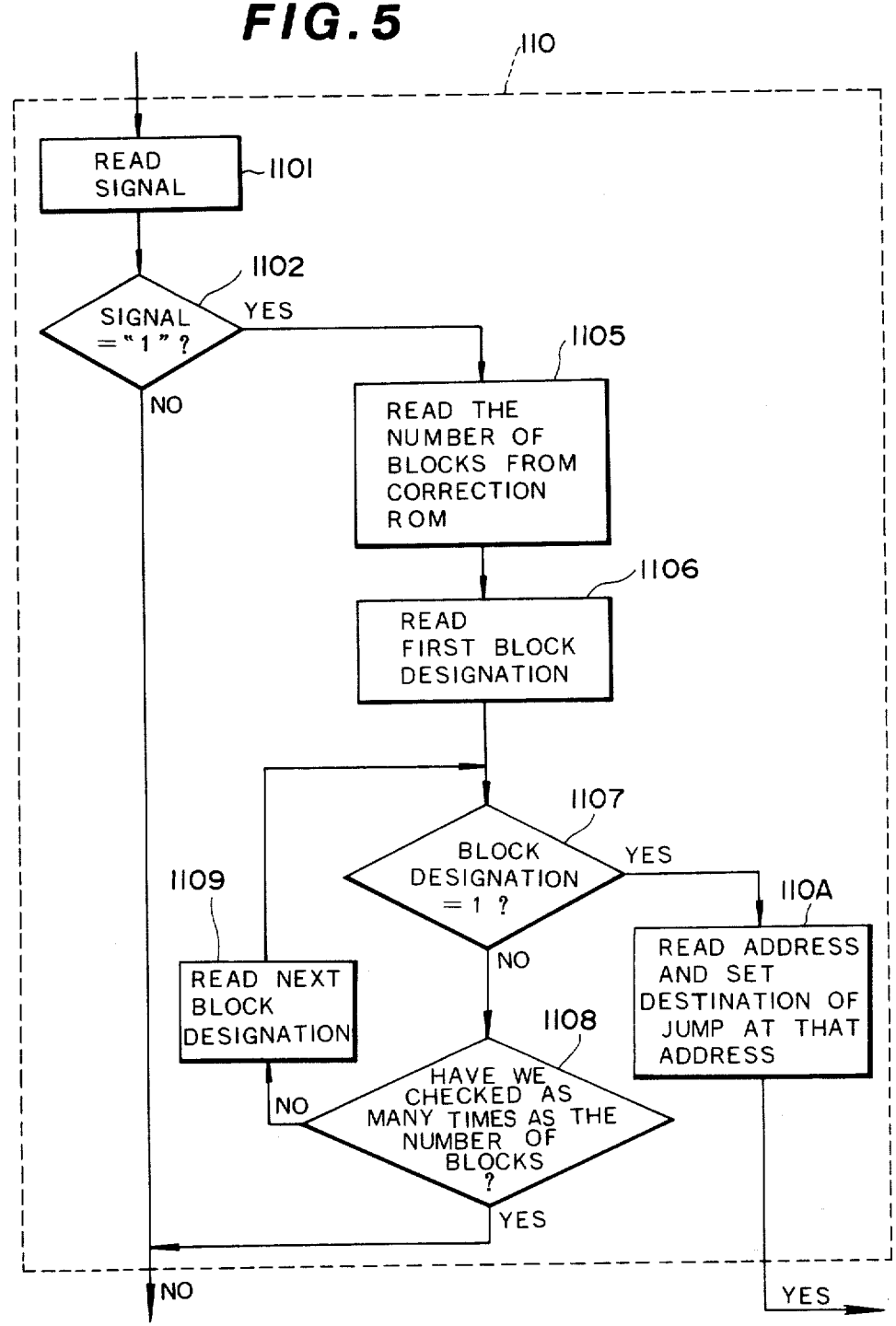
FIG. 5 is a flowchart of steps constituting a second version of block 110 of FIG. 2.
Figure 6:
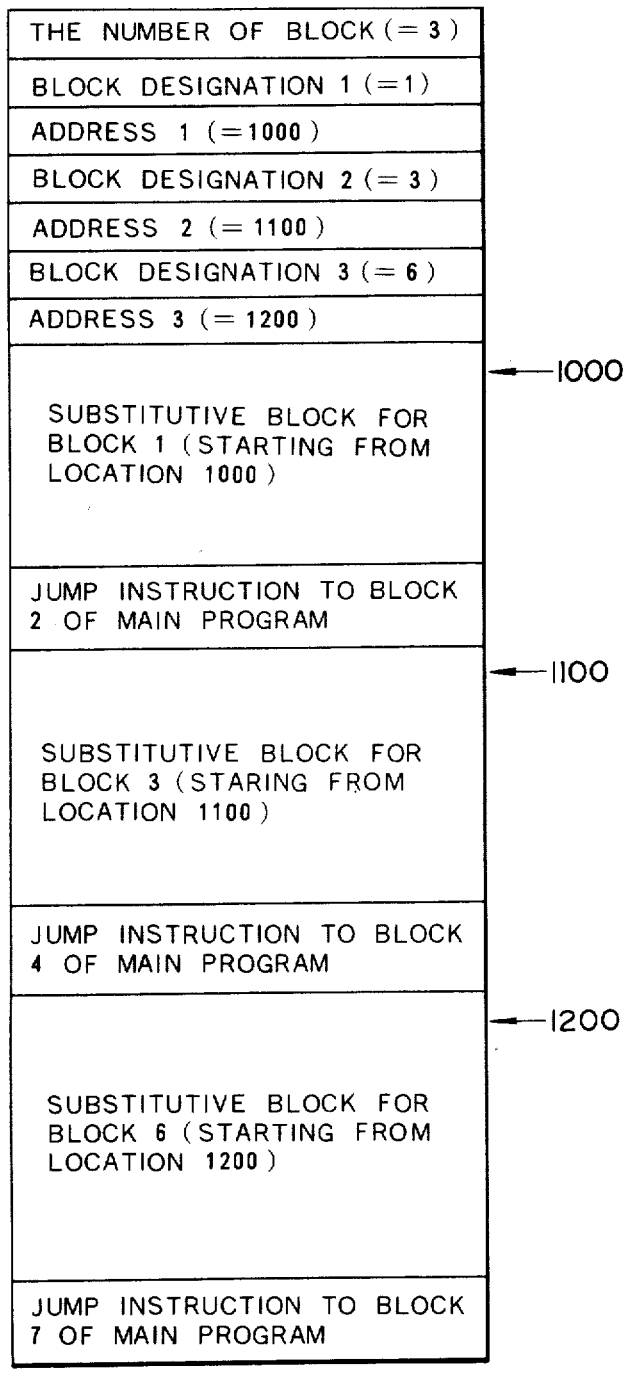
FIG. 6 is a schematic illustration of the memory structure of a correction memory as might be used in connection with the second schematic diagram of version of block 110.

FIGS. 5 and 6 show another example in which more than one block can be changed. In this case, there are stored in the correction ROM 42, the number of blocks to be changed, a plurality of designations of the blocks to be changed and a plurality of substitutive blocks. Furthermore, the starting address of each of the substitutive blocks is stored in the correction ROM 42, as shown in FIG. 6. The starting address of the substitutive blocks is so placed in the correction ROM 42 as to form a pair with the corresponding designation of the block to be changed. If, for example, the number one block is to be changed, the correction ROM stores not only a substitutive block to be substituted for the number one, block but also a pair of datum made up of the designation "one" for designating the number one block and the starting address of the substitutive block for the number one block.

In this example, the step 110 of FIG. 2 is modified as shown in FIG. 5. In FIG. 5, the steps 1101 and 1102 are the same as those in FIG. 3. If the discrimination signal 11 is one and thus indicates that a correction of some block is required, the CPU 30 first reads the number of blocks to be changed (which, in this example, is three) from the correction ROM 42 at a step 1105, and then reads the first designation (which is one, in this example) at a step 1106. At a step 1107, the CPU checks if the designation is one. Since the answer determined in the step 1107 is yes in this example, the CPU goes to a step 110A, where it reads the address 1 (which is 1000, in this example) coupled with the designation 1 and sets the destination of a jump at that address. Thus, the CPU can jump from the main program to the correct location of the correction ROM 42 and execute the substitutive block corresponding to the number one block. If there is no need for a correction of the number one block, and therefore there is no designation of the number one block in the correction ROM 42, the CPU repeats a loop of steps 1107, 1108 and 1109 until all the designations stored in the correction ROM are checked, and finally decides that the number one block is not to be changed and goes to the step 115 of FIG. 2.

In this example, the number three block is replaced by the substitutive block starting from the location 1100 and the number six block is replaced by the substitutive block starting from the location of 1200 in a similar manner.

It is possible to correct data stored in the main ROM 41 in the same manner as in the case of a correction of a program. In this case, the CPU decides which to use, data in the main ROM or substitutive data in the correction ROM prior to fetching the data.

If there is no need for a correction anywhere in the contents of the main ROM 41, the discrimination signal 11 is maintained at zero and the correction ROM 42 is not mounted. In this case, the CPU can use contents of the main ROM 41 without change by following the flowchart of FIG. 2.

The procedures shown in FIGS. 3 and 5 can be designed as a subroutine because these procedures do not differ from one block to another except for the number of a block. Furthermore, the steps in FIGS. 3 and 5 excluding the steps 1101 and 1102 are not necessary when there is no need for a correction anywhere in the main ROM 41, so that the instructions of these steps can be stored in the correction ROM 42.

Figure 7A:
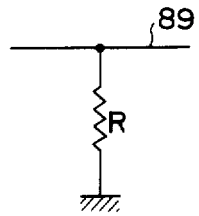
FIG. 7(a) is a second embodiment of the present invention.
Figure 7B:
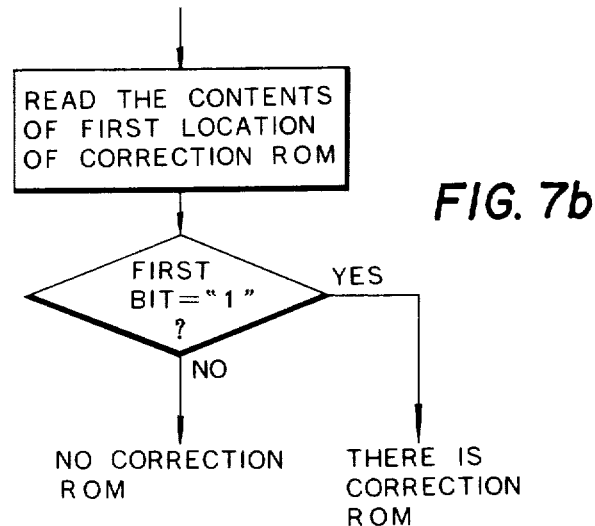
FIG. 7(b) is a partial flowchart of a program such as might be used in connection with the second embodiment.

A second embodiment of the present invention is shown in FIG. 7, in which it is determined, without using the discrimination signal, whether the correction ROM is mounted and incorporated in the computer. In this embodiment, a resistor R is interposed between a predetermined bit line 89 (which can be, for example, the first bit line of the data bus in the system bus 80) and a source of zero voltage. Furthermore, a bit one is preliminarily stored in a predetermined bit of a predetermined location, for example, the first bit of the first location, of the correction ROM 42. With this arrangement, the CPU performs a check shown in FIG. 7(b). The CPU 30 first reads the contents of the predetermined location, the first location, for example, of the correction ROM 42, and then checks the value of the predetermined bit, the first bit, for example. If the correction ROM is really mounted, the output signal on the data line 89 from the correction ROM 42 is determined by the value "one" stored in the predetermined location in the correction ROM 42 and driven by buffers, so that the value on the data line 89 equals logic "one" while a current flows through the resistor R. Therefore, the first bit of the word which the CPU reads is also "one". If, on the other hand, the correction ROM 42 is not mounted, the data bus is not driven by another ROM or RAM and maintained in an open circuit (high-impedance) state during this read cycle, so that the signal on the data line 89 is reduced to zero volts. Therefore, the first bit of the word which the CPU reads is also "ZERO". Thus, the CPU can determine whether the correction ROM 42 is mounted or not by checking the first bit of the data. It is optional to check more than one bits in order to improve the reliability of the check as to whether the correction ROM is mounted.

Figure 8:
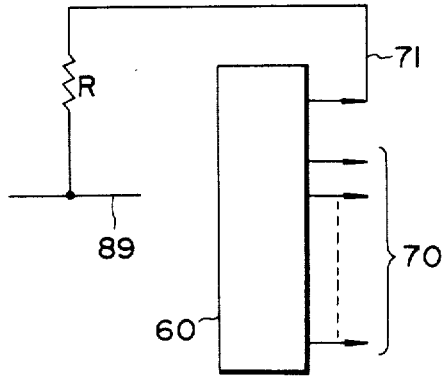
FIGS. 8 is a schematic diagram a third embodiment of the present invention.
Figure 9:
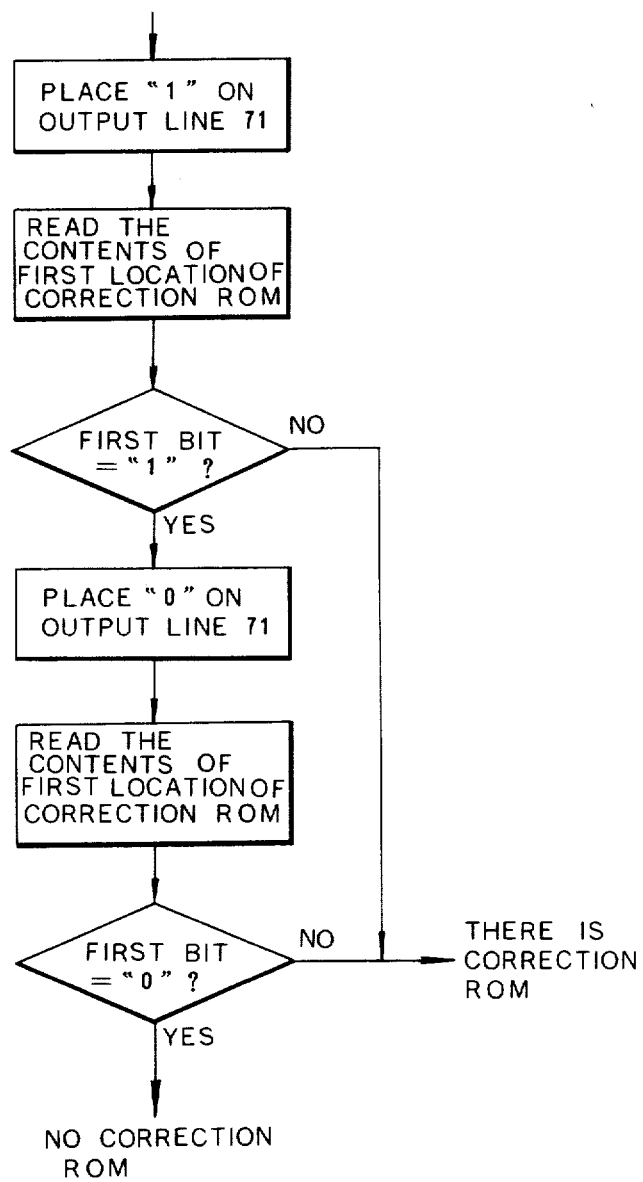
FIG. 9 is a partial flowchart of a program such as might be used in connection with the third embodiment.

A third embodiment is shown in FIGS. 8 and 9, in which it is determined without using the discrimination signal whether the correction ROM is mounted, as in the second embodiment. In this embodiment, a predetermined output line 71 of the output section 60 is connected through a resistor R with a predetermined data line 89 which is the first bit line in this example. With this arrangement, the CPU performs checks as shown in FIG. 9. First, the CPU places the value "one" on the output line 71 of the output section 60, reads the contents of a predetermined location, for example, the first location, of the correction ROM 42, and then checks if the first bit, for example, of the read data is equal to one. Secondly, the CPU places the value "zero" on the output line 71 of the output section 60, reads the contents of the predetermined location of the correction ROM 42 and then checks if the first bit of the read data is equal to zero.

If the correction ROM 42 is mounted, the value on the data line 89 is determined by the contents of the predetermined location of the correction ROM 42 independently of the value on the output line 71. Therefore, the first bit of the data which the CPU reads is always one or zero.

If, on the other hand, the correction ROM 42 is not mounted, the CPU reads the value on the data line 89 which is always equal to the value on the output line 71. Accordingly, the CPU can determine that the correction ROM is not mounted if the answers of both of checks are yes, that is, if the value read by the CPU is always equal to the value placed on the output line 71. On the other hand, the CPU can determine that the correction ROM is mounted, if a mismatch is detected between the value read by the CPU and the value place on the output line 71. This embodiment has the advantage that there is no need for preliminarily storing a special check bit in the correction ROM.

Figure 10:
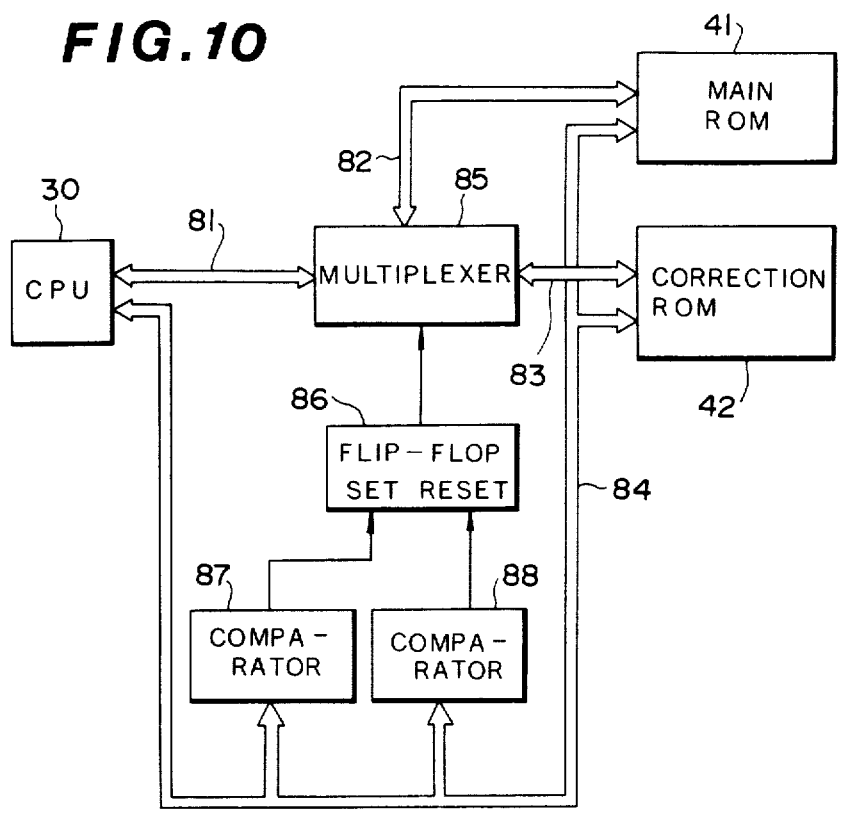
FIG. 10 is a block diagram showing a fourth embodiment of the present invention.

A fourth embodiment is shown in FIG. 10. In the preceding embodiments, programs or data in the main ROM must be preliminarily divided into a plurality of blocks and provided with check steps such as the steps 1101 and 1102 in order to correct a portion of the program or the data. The fourth embodiment eliminates the necessity of such a preliminary arrangement for programs or data to be corrected.

Unlike the preceding embodiments, the CPU 30, in this embodiment, is connected alternatively with either of the main ROM or the correction ROM through a data bus. In FIG. 10, a data bus 81 of the CPU 30 is connected alternatively with a data bus 82 of the main ROM 41 or a data bus 83 of the correction ROM 42 under the control of a multiplexer 85. The multiplexer 85 is switched from one state to the other by a flip-flop 86, which in turn, is set by a first comparator 87 and reset by a second comparator 88. A reference numeral 84 denotes an address bus and a control bus. In FIG. 10, a RAM 50, an input section 20 and an output section 60 are omitted because they are arranged in the same manner as in FIG. 1.

By way of example, let us suppose that it is desired to correct a portion of a main program from a location A (address 2000) to a location B (address 2100) and after the correction, to continue to execute the program from a location C (address 2101). In this case, there is stored, in the correction ROM 42, substitutive information to be substituted for the portion of the main program from the location A to the location B, and a first instruction of the main program which the CPU is to execute first after the correction. Moreover, the addresses of the locations A, B and C are also stored in the correction ROM 42. The first comparator 87 compares the value on the address bus with the address 2000 of the location A. If a match is detected therebetween, the first comparator 87 sets the flip-flop 86, which in turn brings the multiplexer 85 to one state where the data bus 81 of the CPU is cut off from the data bus 82 of the main ROM and instead connected with the data bus 83 of the correction ROM. Thus, in this state, the CPU operates under the control of instructions and/or data stored in the correction ROM.

The second comparator 88 compares the value on the address bus with the address 2101 of the location C. If a match is detected therebetween, the first comparator 88 resets the flip-flops 86, which in turn brings the multiplexer 85 to the other state where the data bus 81 is connected with the data bus 82 of the main ROM. Thus, the CPU can execute the main program a portion of which is replaced by instructions and/or data stored in the correction ROM 42. It is noted that the program in the main ROM 41 does not need any special arrangement.

It is possible to use a time-shared bus for transmission of both data and address, in this embodiment, if read cycle and switching of the bus are performed in accordance with timing of the time sharing.

Integrated circuits can be used as the multiplexor 85, the flip-flop 86 and the comparator 87 and 88.

It is optional to use the output section 60 instead of the second comparator 88 for triggering the flip flop 86. In this case, the output section 60 is arranged to send a trigger signal to the flip-flop 86 at the end of a substitutive program of the correction ROM under the control of instruction stored in the correction ROM.

In order to avoid errors of reading due to chatter or delay of switching action of the multiplexer 85, it is advantageous to suspend or hold the operation of the CPU 30 for a time during switching action of the multiplexor 85. This can be done by the use of a monostable multivibrator which is triggered when the comparator 87 or 88 detects a match of addresses and the multiplexer 85 is switched, and arranged to request the CPU to suspend its operation for a predetermined interval. Usually, a central processing unit has an input terminal for receiving such a request signal.

When a correction of the main ROM is not yet required, the multiplexer 85 is fixedly maintained at the state where the CPU is always connected with the main ROM 41.

Figure 11:
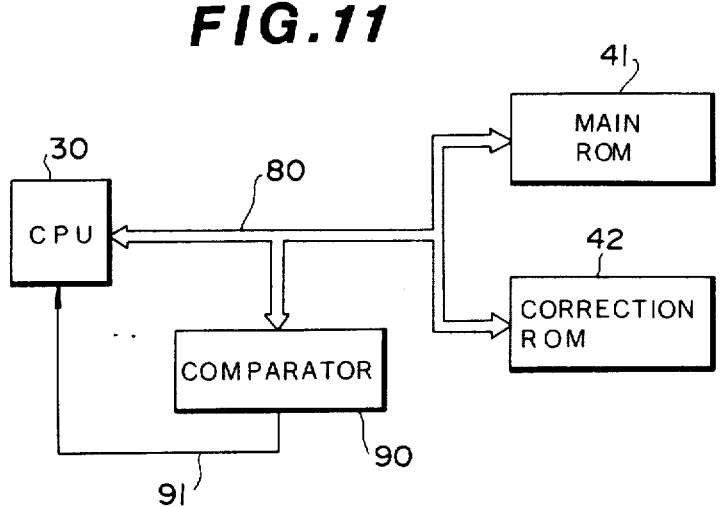
FIG. 11 is a block diagram showing a fifth embodiment of the present invention.

A fifth embodiment is shown in FIG. 11, in which an interrupt is used for a correction of the main ROM in circumstances where the CPU is provided with an interrupt handling means.

In this embodiment, there is provided a single comparator 90 for producing an interrupt request signal, and the address information is stored in the correction ROM 42 for indicating which portion of the main ROM 41 is to be corrected. If, for example, the portion to be corrected is stored in locations 2000 to 2100 of the main ROM 41, the comparator 90 compares the value on the address bus with address 2000. If the comparator 90 detects a match therebetween, it sends an interrupt request signal 91 to an interrupt input of the CPU 30. In response to the interrupt signal, the CPU transfers control to an interrupt handling routine, where the CPU executes the substitutive program in the correction ROM in place of the portion of the main program to be corrected and returns to the main program of the main ROM 41 at the point next to the replaced portion, thereby to continue to execute the main program.

In this case, it is necessary to preliminarily insert, in the main program of the main ROM 41, an instruction for causing a jump to a substitutive program in the correction ROM 42 upon reception of the interrupt signal. It is not necessary to correct the main program block by block, and it is possible to correct any desired portion of information stored in the main ROM 41. In this embodiment, too, a RAM 50, an input section 20 and an output section 60 are arranged in the same manner as in FIG. 1, but the arrangement is simplified compared with the arrangement of FIG. 10.

In general, PROMs are suitable for use as the correction ROM 42 of the present invention. Although PROMs are more expensive than mask ROMs, PROMs can be programmed by the user in a short time, and besides, they are reliable. However, mask ROMs may be also used as the correction ROM 42. In this case, if the mask ROM used as the correction ROM 42 has a small capacity, its use can save time and cost compared with the case in which a mask ROM of a large capacity used as the main ROM 41 is renewed.

EPROMs may be also used if cost is not so important. In this case, information in the main ROM can be frequently changed by erasing and reusing the EPROM used as the correction ROM.

As explained above, the present invention enables one to change a portion of information stored in ROM easily and inexpensively. Accordingly, corrections or improvements in a computer system can be easily attained after development or manufacturing. Furthermore, the arrangement of the present invention is advantageous for manufacturing a wide variety of models by adding various modifications to products of a basic model as in the case of automobile manufacturing.

What is claimed is:

1. A computer comprising:
   a system bus;
   a central processing unit (CPU) connected to said system bus;
   main read only storage means connected to said system bus for storing main information;
   correction storage means connected to said system bus for storing substitute information to be substituted for at least one portion of said main information, said correction storage means being incorporated in said computer when a change of said portion is desired; and
   means connected to said system bus for detecting whether said correction storage means is incorporated into said computer and for generating a discrimination signal on said system bus having one of a first value definitely indicating that said correction storage means is incorporated into said computer, and a second value different from said first value definitely indicating that said correction storage means is not incorporated into said computer.

2. A computer according to claim 1, wherein said correction storage means comprises means for storing index data for designating said portion of said main information, said CPU being arranged to read said index data to determine which portion of said main information is to be replaced.

3. A computer according to claim 2, wherein said detecting means comprises a signal generator which produces said discrimination signal.

4. A computer according to claim 2, wherein said detecting means comprises a resistor one end of which is connected with a predetermined line of said system bus which is capable of transmitting information from said correction storage means to said CPU and the other end of which is connected with a voltage source having a first signal level corresponding to said second value, said correction storage means storing a bit corresponding to a second signal level, different from said first signal level and corresponding to said first value, at a predetermined storage location, said CPU operable to check a signal value on said predetermined line when accessing said predetermined storage location of said correction storage means and so determine whether said signal value is equal to said second signal level, thereby determining whether said correction storage means has been incorporated into said computer.

5. A computer according to claim 2, wherein said main information is a program, which is divided into a plurality of main blocks one of which includes said portion, said substitute information being a substitute block which is to be substituted for the main block which includes said portion, said index data being a designation of the main block which includes said portion, said CPU operable to enter said plurality of main blocks in sequence and to check, before entering a next main block whether said next main block is that designated by said index data, and, if it is, to enter said substitute block, and, if it is not, to enter said next main block.

6. A computer according to claim 2, wherein said main information is a program, which is divided into a plurality of main blocks, said substitute information is a substitute program divided into a plurality of corresponding substitute blocks which are to be substituted for some of said main blocks, said index data being designations of the main blocks each of which is to be replaced by a corresponding one of said substitute blocks, said CPU being operable, before entering each of said main blocks in said second case, to check whether that main block is designated to enter said plurality of main blocks in a sequence, and to check before entering a next main block, whether said next main block is one of those designated by said index data, and, if it is, to enter said corresponding substitute block, and, if it is not, to enter said next block.

7. A computer according to claim 6, wherein each of said designations is accompanied by address data which is also stored in said correction storage means and indicates a memory location where a first instruction of a corresponding substitute block is stored, said CPU being operable, when one of said main blocks is designated by one of said designations, to read the address data accompanying the designation currently being checked and to transfer control to a location indicated by the address data accompanying the designation currently being checked.

8. A computer comprising:
   a central processing unit (CPU);

main read only storage means for storing main information;

correction storage means for storing substitute information to be substituted for at least one portion of said main information;

a system bus connected to said CPU, said main read only storage means, and said correction storage means, and having a first state in which said system bus interconnects said CPU with said main read only storage means but not with said correction storage means, and a second state in which said system bus interconnects said CPU with said correction storage means, but not with said main read only storage means;

first comparing means connected to said system bus for comparing an address which said CPU is accessing with a first predetermined address and producing a first signal when a match is detected therebetween;

second comparing means connected to said system bus for comparing the address which said CPU is accessing with a second predetermined address and producing a second signal when a match is detected therebetween; and selecting means connected to said system bus and connected with said first and second comparings means for changing said system bus from said first state to said second state in response to said first signal and from said second state to said first state in response to said second signal.

9. A computer according to claim 8, wherein said system bus comprises a data bus system and an address bus, and said data bus system further comprises:

a first data bus connecting said CPU and said selecting means;

a second data bus connecting said selecting means and said main read only storage means; and a third data bus connecting said selecting means and said correction storage means, said first data bus being connected with said second data bus and disconnected from said third data bus in said first state, said first data bus being connected with said third data bus and disconnected from said second data bus in said second state.

10. A computer comprising:

a central processing unit (CPU);

main read only storage means for storing main information;

an output section for handling communication between said computer and outside devices;

correction storage means for storing substitute information to be substituted for at least one portion of said main information;

a system bus connected to said CPU, said main read only storage means, said output section, and said correction storage means, and having a first state in which said system bus interconnects said CPU with said main read only storage means but not with said correction storage means, and a second state in which said system bus interconnects said CPU with said correction storage means, but not with said main read only storage means;

first comparing means connected to said system bus for comparing an address which said CPU is accessing with a predetermined address and producing a first signal if a match therebetween is detected;

selecting means connected with said system bus and with said first comparing means for changing said system bus from said first state to said second state in response to said first signal;

said output section being arranged to produce a second signal under control of an instruction stored in said correction storage means, said selecting means being connected with said output section and arranged to change said system bus from said second state to said first state in response to said second signal.

11. A computer according to claim 10, wherein said system bus comprises a data bus system and an address bus, and said data bus system further comprises:

a first data bus connecting said CPU and said selecting means;

a second data bus connecting said selecting means and said main read only storage means; and a third data bus connecting said selecting means and said correction storage means, said first data bus being connected with said second data bus and disconnected from said third data bus in said first state, said first data bus being connected with said third data bus and disconnected from said second data bus in said second state.

12. A computer comprising:

a central processing unit (CPU);

main read only storage means for storing main information;

correction storage means for storing substitute information;

a system bus connected to said CPU, said main read only storage means, and said correction storage means;

comparing means connected to said system bus for comparing an address which said CPU is accessing with a first predetermined address of said main storage and producing a first signal when a match therebetween is detected;

said CPU including interrupt handling means which, in response to said first signal from said comparing means, causes said CPU to fetch and use said substitute information instead of said main information and after that to return to said main information at a location having a second predetermined address, thereby to substitute said substitute information for a predetermined portion of said main information.

13. A computer according to claim 12, wherein said main information is a program, said first predetermined address is the address of a location where a first instruction of said predetermined portion of said main information is stored, and said second predetermined address is the address of a location where a next instruction immediately following said predetermined portion is stored.

14. A computer comprising:

a system bus;

a central processing unit (CPU) connected to said system bus; and main read only storage means connected to said system bus for storing main information;

said computer being adapted to receive correction storage means for storing substitute information to replace at least one portion of said main information and for generating a signal on said system bus having one of a first value definitely indicating that said correction storage means has been connected into said computer and a second value different from said first value definitely indicating that said correction storage means has not been connected into said computer; and said CPU being adapted to respond to said signal when attempting to retrieve said at least one portion of said main information by retrieving said substitute information from said correction storage means when said signal has said first value, and by retrieving said at least one portion of said main information when said signal has said second value.

15. Correction storage means comprising:

means for storing substitute information to replace portions of main information stored in a main read only storage means in a computer; and means for generating a signal having one of a first value from which said computer can definitely determine that said correction storage means has been electronically incorporated therein and a second value different from said first value from wherein said computer can definitely determine that said correction storage means has not been incorporated therein;

said computer adapted to receive said correction storage means and having a CPU adapted to retrieve said substitute information rather than said selected portions of said main information if said correction storage means has been electronically incorporated in said computer.

16. A computer comprising:

a system bus, a central processing unit (CPU) connected to said system bus;

main read only storage means connected to said system bus for storing main information;

correction storage means connected to said system bus for storing substitute information to be substituted for at least one portion of said main information, said correction storage means being incorporated in said computer when a change of said portion is desired; and means connected to said system bus for detecting whether said correction storage means is incorporated into said computer, said detecting means supplying a first signal to said CPU when said CPU performs a predetermined data transfer operation to move data from a predetermined address into said CPU while said correction storage means is not incorporated into said computer, and a second signal different from said first signal to said CPU when said CPU performs the predetermined data transfer operation while said correction storage means is incorporated into said computer, said CPU being adapted to determine whether said correction storage means is incorporated into said computer or not by performing the predetermined data transfer operation, and retrieve said substitute information instead of said portion of main information when said CPU determines that said correction storage means is incorporated into said computer.

17. A computer comprising:

a system bus;

a central processing unit (CPU) connected to said system bus; and main read only storage means connected to said system bus for storing main information, said computer being adapted to receive correction storage means for storing substitute information to replace at least one portion of said main information, said computer further comprising means connected to said system bus for detecting whether said correction storage means is incorporated into said computer, said detecting means supplying a first signal to said CPU when said CPU performs a predetermined data transfer operation to move data from a predetermined address into said CPU while said correction storage means is not incorporated into said computer, and a second signal different from said first signal to said CPU when said CPU performs the predetermined data transfer operation while said correction storage means is incorporated into said computer, and said CPU being adapted to determine whether said correction storage means is incorporated by performing the predetermined data transfer operation, and to retrieve said substitute information instead of said portion of said main information when said CPU determines that said correction storage means is incorporated.

18. A computer comprising:

a system bus;

a central processing unit (CPU) connected to said system bus;

main read only storage means connected to said system bus for storing main information;

correction storage means connected to said system bus for storing substitute information to be substituted for at least one portion of said main information, said correction storage means being incorporated in such computer when a change of said portion is desired; and detecting means comprising a resistor, one end of which is connected with an output line which is capable of transmitting a signal from said computer to an external device under command of said CPU, and the other end of which is connected with a predetermined line of said system bus which is capable of transmitting information from said correction storage means to said CPU;

said CPU being arranged to perform a first check comprising reading a line value on said predetermined line of said system bus while said CPU is accessing a predetermined location of said correction storage means and placing a first predetermined value on said output line, and checking whether said line value is equal to said first predetermined value, and a second check comprising reading said line value on said predetermined line of said system bus while said CPU is accessing said predetermined location of said correction storage means and placing a second different predetermined value on said output line, and checking whether said line value is equal to said second predetermined value thereby detecting whether said correction storage means has been incorporated into said computer.

* * * * *